IMPEDANCE NETWORK HYBRID COMPUTER

Filed Nov. 16, 1967 2 Sheets-Sheet 1

INVENTORS:
Lucien C. MALAVARD
Pierre M. MARTY
Guy C. RENARD

By Abraham A. Saffitz
ATTORNEY

INVENTORS:
Lucien C. MALAVARD
Pierre M. MARTY
Guy C. RENARD
By Abraham A. Saffitz
ATTORNEY

United States Patent Office 3,517,169

Patented June 23, 1970

3,517,169

IMPEDANCE NETWORK HYBRID COMPUTER

Lucien C. Malavard, Paris, Pierre M. Marty, Verriere-le-Buisson, and Guy C. Renard, Bagneux, France, assignors to Centre National de la Recherche Scientifique, Paris, France, a company of France Filed Nov. 16, 1967, Ser. No. 683,616

Claims priority, application France, Nov. 18, 1966, 84,079

Int. Cl. G06j *1/00*

U.S. Cl. 235—150.5 3 Claims

ABSTRACT OF THE DISCLOSURE

Hybrid computer of the impedance network type comprising an array of impedances connected therebetween at nodes, means for digitizing analog values of currents to be injected into said nodes and forming thereby binary code values of said currents, injector means associated with the array nodes which are adapted to selectively inject the nodes with a positive unit current, a negative unit current or a zero current, means for controlling said injector means and injecting the nodes, during successive injection cycles respectively corresponding to the binary weights of the current coded values, with unit currents when the digits of a given binary weight of said current binary code values are ones and with zero currents when the digits of the same weight are zeros, means for scanning said nodes during each injection cycle and deriving from said scan analog component values of the potentials of the nodes, means for digitizing these analog component potential values and forming thereby binary code values of said component potentials, and accumulator means for respectively totalizing the component potential binary code values pertaining to the several nodes.

The present invention relates to an impedance network computer and more particularly to a hybrid computer of this kind, that is to say a computer having an analog part and a digital part.

It is well known that an impedance network is an analog resolver of linear equations by the action, at each nodal point of the network, of Kirchhoff's law. If, for example, we consider a central node at a potential $V_0$ at which there is injected a current of amplitude $I_0$ and if it is assumed that this node is joined through resistances R to four other lateral nodes having potentials of $V_1$, $V_2$, $V_3$, and $V_4$ respectively, then:

$$(V_1-V_0)+(V_2-V_0)+(V_3-V_0)+(V_4-V_0)=-RI_0 \quad (1) \qquad (1)$$

Such an equation can be written at each nodal point, including the peripheral nodal points, where there is additionally available relationships deduced from the limiting conditions and consequently at which the potential is given, or the current is given, or there exists a relationship between the potential and the current.

Impedance networks are currently used for the resolution of systems of linear equations and the topology and nature of the impedances of the network depends on the system of equations to be resolved. One of the most important applications of analog computers of the impedance network kind is the resolution of certain types of partial differential equations which are currently encountered in the study of real systems (physical, chemical, biological, mechanical, thermal etc.). The process is as follows.

If it is assumed that the phenomenon studied evolves in a two-dimensional domain, the domain is converted to discrete form by means of a regular network of lines and columns and, at the level of each node, the partial differential equation on which the phenomenon depends is converted into a finite difference equation. Thus, with an equation of the Poissonian type $$\Delta\phi=-F$$

in which $\phi$ and F are functions of two variables $x$ and $y$, we consider two points $M_1$ and $M_3$ at a distance $\pm\alpha$ from a central point $M_0$, the direction $M_1$, $M_0$, and $M_3$ being parallel to the $x$ axis, and two points $M_2$ and $M_4$ at a distance $\pm\alpha$ of the said central point $M_0$, the direction $M_2$, $M_0$ and $M_4$ being parallel to the $y$ axis, and we form the finite differences:

$$\frac{\phi_1-\phi_0}{\alpha} \text{ and } \frac{\phi_3-\phi_0}{-\alpha}$$

which represent two discrete values of $\partial\phi/\partial x$, respectively between the points $M_0$ and $M_1$ and the points $M_3$ and $M_0$ and $$\frac{\phi_2-\phi_0}{\alpha} \text{ and } \frac{\phi_4-\phi_0}{-\alpha}$$

which represent two discrete values of $\partial\phi/\partial y$, respectively between the points $M_0$ and $M_2$ and the points $M_4$ and $M_0$; then we form the differences of differences:

$$\frac{1}{\alpha}\left[\frac{\phi_1-\phi_0}{\alpha}-\frac{\phi_3-\phi_0}{-\alpha}\right]$$

and $$\frac{1}{\alpha}\left[\frac{\phi_2-\phi_0}{\alpha}-\frac{\phi_4-\phi_0}{-\alpha}\right]$$

which represent respectively $$\partial^2\phi/\partial x^2 \text{ and } \partial^2\phi/\partial y^2$$

in discrete form, at $M_0$. In these differences $\phi_0$, $\phi_1$, $\phi_2$, $\phi_3$, $\phi_4$, represent the values of the function $\phi$ at points $M_0$, $M_1$, $M_2$, $M_3$, $M_4$. Thus the Equation 2 can be written:

$$(\phi_1-\phi_0)+(\phi_2-\phi_0)+(\phi_3-\phi_0)+(\phi_4-\phi_0)=-\alpha^2F_0 \quad (3)$$

in which $F_0$ is the value of F at point $M_0$.

The operation of the impedance network computer is based on the identification of the Equations 1 and 3, the potentials of the nodes representing the function $\phi$, the currents injected at the nodal points representing the function F and the impedances representing the distances between the nodal points. The network must evidently be correctly energized at its periphery, that is to say taking into account the limiting conditions imposed on $\phi$ by the problem. The precision with which $\phi$ is obtained at all nodes of the domain depends, apart from the experimental factors, on the fineness of the network. This is not a serious handicap.

The impedance network computers which have just been described comprise an injector for each node and this injector is an analog injector in the sense that it must be able to inject currents of any predetermined value whatsoever.

In practice, to impose currents at the nodes of the impedance network is not easy and the injectors which are at present best able to do this are those in which the output current depends on the potential applied to their input, thereby replacing the determination of the injected currents by that of the control potentials of the said injectors; this facilitates the adjustment of the injectors but in no way removes the necessity for adjusting the control potential of the injector for each node. If we consider problems involving a large number of nodes (several thousands), the use of such injectors at the rate of one injector for each node becomes prohibitive. There are two reasons for this: firstly there is the question of cost, each injector comprising enough electronic components to make it expensive; and then there is the question of time, as each injector has to be adjusted to its value and this has to be checked. It is, therefore, sufficient to consider the cases in which the injections are a priori unknown, owing to their dependence on the solution, and which as a consequence require iterations, to be persuaded that the method rapidly becomes impracticable.

The object of the invention is to provide a hybrid impedance network computer in which the injectors are of a very simple form and are controlled in an "all or nothing" manner.

According to the invention, the injection is digitized, that is to say the injectors corresponding to the different nodes of the impedance network are ternary injectors capable of injecting a positive unit current, a negative unit current, or no current. The absolute analog values of the currents to be injected are converted into binary digital values by an analog to digital converter; simultaneous injections at all the nodes, corresponding to the binary digits of successive weights of the said binary digital values with their sign, are successively effected and the potential components of the nodes resulting from the said successive partial injections are accumulated in a digital adder.

The invention will now be described in detail with reference to the accompanying drawings, in which.

Figures 1, 3:
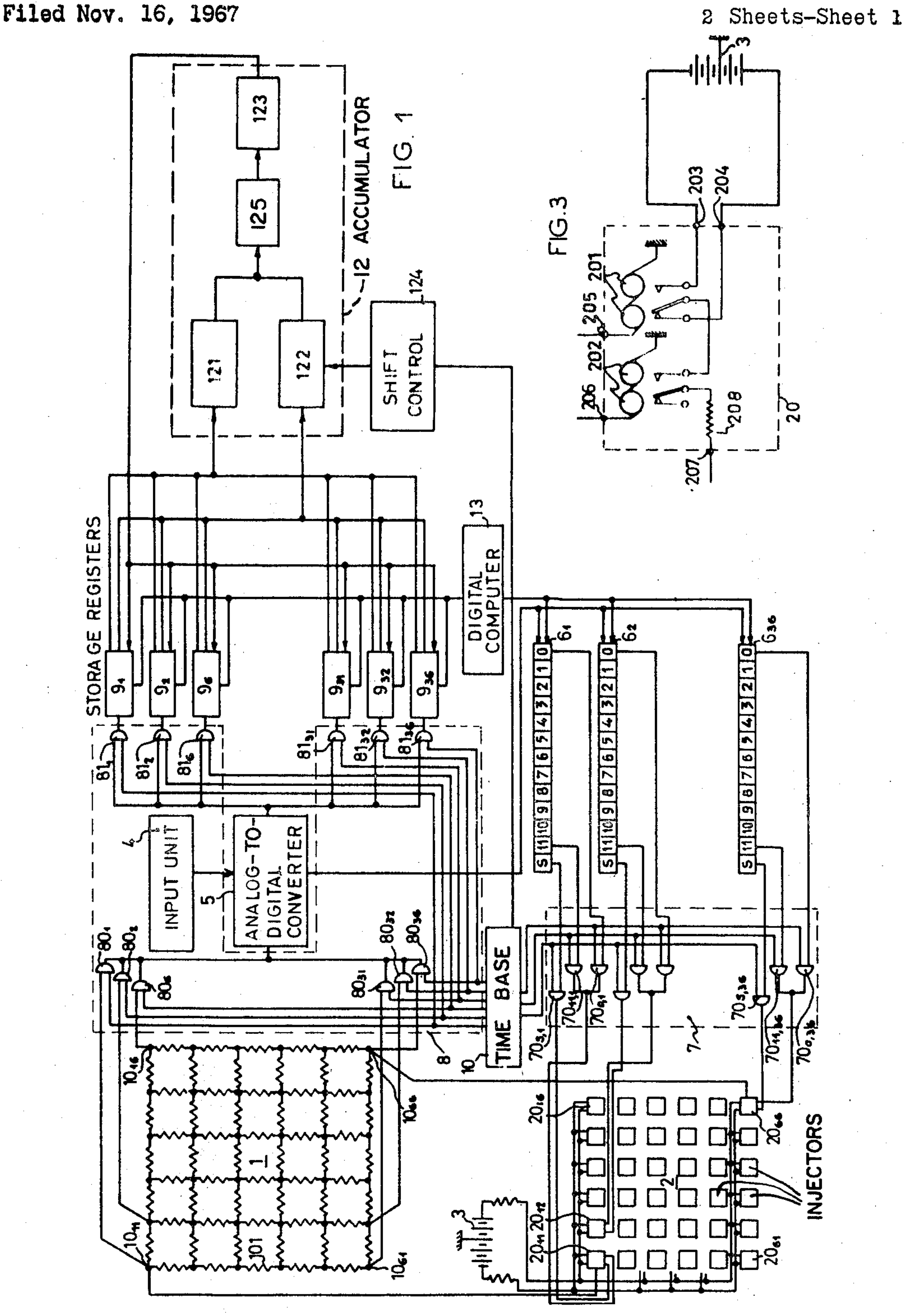
FIG. 1 shows, partly as a block diagram, the hybrid impedance network computer embodying the invention.
FIG. 3 shows one form of the injector.

Referring to FIG. 1, 1 represents an impedance network having sixty impedances, the impedances of which are indicated by the numeral 101, and having thirty-six nodes which are designated by $\mathbf{10}_{11}$ to $\mathbf{10}_{16}$, $\mathbf{10}_{21}$ to $\mathbf{10}_{26}$, . . . $\mathbf{10}_{61}$ to $\mathbf{10}_{66}$ and 2 represents a battery of thirty-six ternary injectors designated $\mathbf{20}_{11}$ to $\mathbf{20}_{16}$, $\mathbf{20}_{21}$ to $\mathbf{20}_{26}$, . . . $\mathbf{20}_{61}$ to $\mathbf{20}_{66}$. Each injector is associated with a node of the network. Each injector has a supply input, a sign input and a code input, together with an injection output. All the supply inputs are connected to a D.C. source 3 which supplies selectively currents of opposite directions. The injection output of each ternary injector $\mathbf{20}_{pq}$ is connected to the node $\mathbf{10}_{pq}$ having these same indices.

4 indicates an input board for injecting given data in analog form, connected to an analog to digital converter 5. The output of this converter can be selectively connected to thirty-six registers $\mathbf{6}_1$ to $\mathbf{6}_{36}$ each having a sign stage marked S and twelve code stages numbered from 0 to 11. The device 5 includes means for switching each digitized data to be injected to one of the registers. Once the given data to be injected have been converted into numerical data, the registers $\mathbf{6}_1$ to $\mathbf{6}_{36}$ are filled with the binary values representing the currents to be injected at the thirty-six nodes of the network and with their sign.

Electronic means for converting a voltage input signal from analog to digital representation are known in the prior art. One of the most frequently used employs a linear ramp voltage which is compared with a reference voltage (usually zero) in a first comparator and the input voltage in a second comparator. The time interval between the two comparison signals is timed through the use of a counter which is supplied with clock pulses having an accurately controlled frequency. Such an analog to digital converter is disclosed in the textbook "Digital Computer Components and Circuits" by R. K. Richards, D. Van Nostrand Company, Inc., published November 1957, FIG. 11–7, p. 287. The input unit 4 of FIG. 1 is formed by the analog input to the second comparator.

The registers $\mathbf{6}_1$ to $\mathbf{6}_{36}$ are shift registers of a known type, such as disclosed in the text "Pulse and Digital Circuits" by Jacob Millman and Herbert Taub, published by the McGraw-Hill Book Company, Inc., New York, 1956. The input of the registers are connected to the output of the counter comprised in converter 5.

The registers $\mathbf{6}_1$ to $\mathbf{6}_{36}$ are connected to the battery of injectors 2 by a switch 7. The sign stages S of the registers $\mathbf{6}_1$ to $\mathbf{6}_{36}$ are connected to the sign terminals of the injectors $\mathbf{20}_{11}$–$\mathbf{20}_{66}$ through gates $\mathbf{70}_{S,1}$ to $\mathbf{70}_{S,36}$, and the stages of given binary weight, 11 and 0 for example, of the registers $\mathbf{6}_1$ to $\mathbf{6}_{36}$ are connected to the code terminals of the injectors $\mathbf{20}_{11}$–$\mathbf{20}_{66}$ through gate $\mathbf{70}_{11,1}$ to $\mathbf{70}_{11,36}$ and $\mathbf{70}_{0,1}$ to $\mathbf{70}_{0,36}$ respectively.

The gates $\mathbf{70}_{S,1}$ to $\mathbf{70}_{S,36}$, $\mathbf{70}_{11,1}$ to $\mathbf{70}_{11,36}$ and $\mathbf{70}_{0,1}$ to $\mathbf{70}_{0,36}$ are controlled successively by the time base 10. As a consequence the injectors of the injection battery 2 are simultaneously supplied on the one hand with the binary digits contained in the stages S of the registers and on the other hand successively by the binary digits contained in the stages of binary weight 11 etc., and finally by the binary digits contained in the stages of weight 0.

As each binary injection is made, corresponding potential components appear at the said nodes which have analog values. These analog potentials are applied in sequence to the analog to digital converter 5 through switch 8. In greater detail, the different nodes are connected to the analog to digital converter 5 through gates $\mathbf{80}_1$ to $\mathbf{80}_{36}$ which are opened in sequence by the time base 10. This time base includes, in addition to the thirteen control outputs leading to the gates of switch 7, thirty-six outputs leading to the gates of switch 8. Switch 8 must completely scan its thirty-six positions between the moments of scanning of two successive positions of switch 7. To do this, the time-base 10 distributes to the thirty-six groups of two gates $\mathbf{80}_1$–$\mathbf{81}_1$ to $\mathbf{80}_{36}$–$\mathbf{81}_{36}$ fast rate pulses of a given recurrence frequency and to the thirteen groups of thirty-six gates $\mathbf{70}_{S,1}$–$\mathbf{70}_{S,36}$ to $\mathbf{70}_{0,1}$–$\mathbf{70}_{0,36}$ slow rate pulses having a recurrence frequency at least thirty-six times lower than that of the fast rate pulses. The time-base 10 may be comprised of pulse-distributors of any known type; for example, it may comprise two delay lines, the first with thirty-six equally spaced apart taps and supplied by clock pulses having a frequency $f$, and the second with thirteen taps and supplied by clock pulses having a frequency $f/36$. Tapped delay lines are disclosed in "A Tapped Electronically Variable Delay Line For Integrated Circuits," by B. D. Anderson et al. in Proceedings of the IEEE, vol. 54, No. 8, August 1966, p. 1118. The time-base may also comprise a ring counter of thirty-six flip flops and a ring counter of thirteen flip flops driven by the same clock pulses as the delay lines. Ring counters are disclosed in the article, "High Speed N-Scale Counters," by T. K. Sharpless, in Electronics March 1948, pp. 122–125.

The output of the analog to digital converter 5 is connected, through the gates $\mathbf{81}_1$ to $\mathbf{81}_{36}$ to thirty-six storage registers $\mathbf{9}_1$ to $\mathbf{9}_{36}$ which serve to store the potential components of the thirty-six nodes in the course of a scanning of the nodes corresponding to one injection after they have been converted into binary code by converter 5. These thirty-six registers are selectively connected to an accumulator 12 comprising an augend shift register 121 and an addend shift register 122, a full binary adder 125, and an output sum register 123 which is itself in selective connection with the thirty-six registers. Accumulators for implementing successive additions are disclosed in the text "Design of Digital Computers" by Hans W. Gschwind, published by Springer-Verlag, New York 1967, p. 137, FIG. 6–50. This figure shows a full adder and three shift registers connected as respectively 125 and 121, 122, 123 in FIG. 1. A circuit 124 controls shift in the register 122 for taking into account the fact that the digital translations of the analog potentials of the nodes correspond to injections of different binary weights. It is thus necessary to divide by 2 the analog potentials relative to a given injection, that is to say to shift by one position towards the right their binary translations, with respect to the analog potentials related to the preceding injection.

The access gates of the storage registers leading to the input registers of the accumulator and the access gates of the output register of the accumulator leading to the storage registers are not shown. The arrangement is such that the content of a given storage register can be transferred into the first input register 121 of the accumulator, that the content of this same register in the course of the next scanning can be transferred into the second input register 122 of the accumulator and that the total of the contents of the first and second input registers 121 and 122 of the accumulator obtained by this latter can be transferred first into the output-register 123 and then into the given storage register. As a consequence, each storage register contains at any given moment the accumulated total of the successive potential components relating to the node with which the storage register is associated.

Thus, there is obtained at the end of the twelve scannings, in the thirty-six output registers $9_1$–$9_{36}$, the values of the function $\phi$ at the thirty-six nodes of the impedance network.

When the injection values are unknown at the commencement, the first step is to place in the input registers $6_1$ to $6_{36}$ reasonable injection values for the first iteration. Then, for the following iterations, the contents of the output registers $9_1$ to $9_{36}$ are applied to a digital machine 13 which computes, as a functiton of the values of $\phi$ at the different nodes, the values of F at these same nodes and introduces them into the registers $6_1$ to $6_{36}$ for a fresh iteration.

To enable the operation of the hybrid impedance network computer of the invention to be better understood, one example of operation will now be described.

It will be assumed that the second member of the Equation 2 is:

$$-F=\lambda(x^2+y^2)$$

The second part of the Equation 3 is consequently:

$$-\alpha^2F_0=\lambda\alpha^2(x_0^2+y_0^2)$$

in which $x_0$ and $y_0$ are the co-ordinates of the point $M_0$.

If $k$ is the ratio between the function $\phi$ and the potential V, then:

$$\phi=kV+\text{constant}$$

In identifying Equations 1 and 3 there is obtained:

$$I_0=-\frac{\lambda\alpha^2}{kR}(x_0^2+y_0^2)$$

$k$ and R are chosen so that $$-\frac{\lambda\alpha^2}{kR}=1$$

The list of nodes of the chosen squared pattern with their corresponding $x$ and $y$ co-ordinates is established and the corresponding decimal and binary values of $I_0$ are calculated. These values are collected in a table such as the following:

| Node No. | $x$ | $y$ | $I_0$ decimal | Sign | $I_0$ binary |
|---|---|---|---|---|---|
| $n$ | 50 | 21 | 2941 | + | 1 0 1 1 0 1 1 1 1 1 0 1 |
| $(n+1)$ | 50 | 22 | 2984 | + | 1 0 1 1 1 0 1 0 1 0 0 0 |

The sign having been previously imposed, there are as many successive injections at the different nodes of the impedance network as there are binary digits in the binary expressions for $I_0$. At each injection, the injectors of the nodes $n$ and $(n+1)$ inject unit current or zero current according to whether the binary digit of the binary weight corresponding to the injection number is a one or a zero. For the first injection corresponding to the binary weight 11, it will be seen that the injector for the node $n$ injects unit current and that the injector for the node $(n+1)$ also injects unit current.

For the twelfth injection, corresponding to the binary weight zero, it will be seen that the injector for the node $n$ injects unit current and that the injector for the node $(n+1)$ injects zero current.

Figure 2:
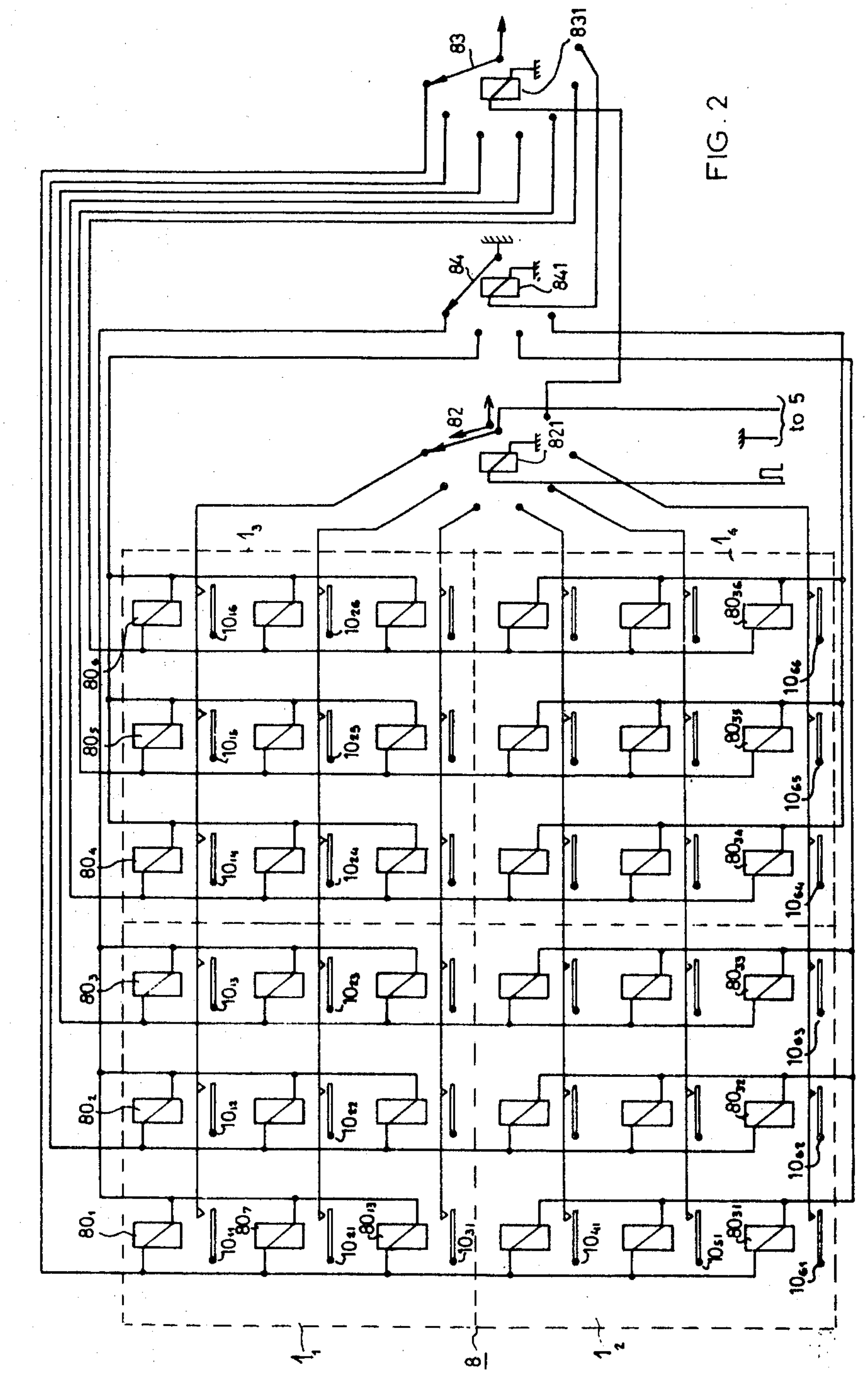
FIG. 2 shows one form of the switch which transmits sequentially to the analog-digital converter the values of the potentials at the nodes of the impedance network in the course of an injection.

FIG. 2 shows one form of switch 8.

In FIG. 1, the nature of the gates $\mathbf{80}_1$ to $\mathbf{80}_{36}$ was left open. In FIG. 2, these gates are electro-mechanical relays controlled by step-by-step selectors.

The impedance network the nodes of which are designated as $\mathbf{10}_{11}$–$\mathbf{10}_{66}$ is divided into a certain number of domains, in this case the four domains $\mathbf{1}_1$ to $\mathbf{1}_4$. With each node there is associated a relay, these being indicated respectively as $\mathbf{80}_1$ to $\mathbf{80}_{36}$. All the terminals on the same side of the relay windings of one domain are connected to one contact of a first step-by-step selector 84. The other terminals of the relay windings are connected by columns to the contacts of a second step-by-step selector 83. Finally, all the fixed blades of the relays are connected in lines to the contacts of a third step-by-step selector 82. When a relay is energized, its movable blade connected to the node is moved on to its associated fixed blade connected to a contact of the step-by-step selector 82. The partial potentials of the nodes therefore appear sequentially on the sweeping arm of this step-by-step selector which is connected to the input of the analog-digital converter 5.

The energisation is carried out in such a manner that, when the selector 82 has effected a cycle under the control of its stepping motor 821, it energizes the stepping motor 831 of the selector 83 and that when the selector 83 has carried out a cycle it energizes the stepping motor 841 of the selector 84. The result of this arrangement is that when with 84 on its first contact, 83 is also on its first contact, the relays $\mathbf{80}_1$, $\mathbf{80}_7$, and $\mathbf{80}_{13}$ are energized; when 83 is on its second contact, the relays $\mathbf{80}_2$, $\mathbf{80}_8$, and $\mathbf{80}_{14}$ are energized and when 83 is on its third contact the relays $\mathbf{80}_3$, $\mathbf{80}_9$, and $\mathbf{80}_{15}$ are energized. The domain $\mathbf{1}_1$ is thus explored in three cycles of the selector 82.

FIG. 3 shows an injector 20. It comprises a polarized or locking relay 201, representing the sign, and a relay 202 of the same type, representing the code. The fixed blades of the sign relay 201 are connected to the two poles of a source of current 3 the middle point of which is grounded. The fixed blades of the code relay 202 are connected one to the movable blade of the sign relay, the other remaining unconnected. The movable blade of the code relay 202 is connected to a resistor 208 of high value in relation to the resistances of the network. It will be seen that the injector has five terminals, two supply terminals 203 and 204 connected respectively to the terminals of the source of current 3, two control terminals (a terminal 205 for the sign and a terminal 206 for the code) and an injection terminal 207.

Although the invention has been described in relation to one embodiment, it will be understood that variations are possible which will fall within the scope of the invention. In particular, it is possible to effect only certain injections corresponding to binary digits of predetermined weights, for example those having the highest weights. It is also possible to inject and read only certain nodes which have previously been defined.

When the network is three-dimensional, each node is connected through resistances R to six other lateral nodes having respectively potentials, $V_1$, $V_2$, $V_3$, $V_4$, $V_5$, $V_6$ and the equation becomes:

$$(V_1-V_0)+(V_2-V_0)+(V_3-V_0)+(V_4-V_0)+(V_5-V_0)+(V_6-V_0)=-RI_0 \quad (1')$$

Such a network permits resolution of equation of the Poissonian type $$\Delta\phi=-F \quad (2')$$

in which $\phi$ and F are functions of three variables in space, $x$, $y$ and $z$.

What we claim is:

1. A hybrid computer of the impedance network type comprising an impedance network including a plurality of impedances arranged in rows and columns and connected therebetween at nodes formed by the intersections of said rows and columns, means for digitizing analog values of currents and forming thereby binary code values of currents to be injected into said nodes, injector means including a DC source and means feeding negative, positive and zero voltage associated with the network nodes and adapted to selectively inject the nodes with a unit positive current, a unit negative current and a zero current from said positive, negative and zero voltage respectively, means for controlling said injector means and injecting said nodes, during successive injection cycles, with unit currents when the digits of a given binary weight of said current binary code values are ones and with zero currents when the digits of the same binary weight of said current binary code values are zeros, the successive injection cycles being associated with the successive weights, means for scanning said nodes during each injection cycle and deriving from said scan analog component values of the potentials of the nodes, means for digitizing said analog component values of potentials and forming thereby component binary code values of potentials, and accumulator means for respectively totalizing the component binary code values of potentials pertaining to the several nodes.

2. A hybrid computer of the impedance network type comprising an impedance network including a plurality of impedances arranged in rows and columns and connected therebetween at nodes formed by the intersections of said rows and columns, an analog to digital converter for digitizing analog values of currents and forming thereby binary multi-stage register means for storing said current binary code values, injector means including a DC source and means for feeding negative, positive and zero voltage associated with the network nodes and adapted to selectively inject the nodes with a unit positive current, a unit negative current and a zero current from said positive, negative and zero voltage respectively, means for cyclically connecting said injector means with the several stages of said register means and injecting said nodes, during successive injection cycles, with unit currents when the digits of a given binary weight of said current binary code values are ones and with zero currents when the digits of the same binary weight of said current binary code values are zeros, the successive injection cycles being associated with the successive stages, means for scanning said nodes during each injection cycle and deriving from said scan analog component values of the potentials of the nodes, means for digitizing said analog component values of potentials and forming thereby component binary code values of potentials, and accumulator means for respectively totalizing the component binary code values of potentials pertaining to the several nodes.

3. A hybrid computer of the impedance network type comprising an impedance network including a plurality of impedances arranged in rows and columns and connected therebetween at nodes formed by the intersections of said rows and columns, means for digitizing analog values of currents and forming thereby binary code values of currents to be injected into said nodes, injector means including a DC source and means feeding negative, positive and zero voltage associated with the network nodes and adapted to selectively inject the nodes with a unit positive current, a unit negative current and a zero current from said positive, negative and zero voltage respectively, means for controlling said injector means and injecting said nodes, during successive injection cycles, with unit currents when the digits of a given binary weight of said current binary code values are ones and with zero currents when the digits of the same binary weight of said current binary code values are zeros, the successive injection cycles being associated with successive weights, means for scanning said nodes during each injection cycle and deriving from said scan analog component values of the potentials of the nodes, an analog to digital converter for digitizing said analog component values of potentials and forming thereby component binary code values of potentials, binary multistage register means respectively associated with the nodes for storing said potential component binary code values and accumulator means for respectively totalizing the component binary code values of potentials pertaining to the several nodes.

References Cited

UNITED STATES PATENTS

| | | | |
|---|---|---|---|
| 2,893,636 | 7/1959 | Parks. | |
| 3,027,082 | 3/1962 | Chao | 235—150.5 X |
| 3,141,968 | 7/1964 | Stubbs et al. | 235—184 X |

EUGENE G. BOTZ, Primary Examiner

J. F. RUGGIERO, Assistant Examiner

U.S. Cl. X.R.

235—184